(12) United States Patent
Cook

(10) Patent No.: X7159
(45) Date of Patent: Jul. 9, 1832

(54) OAKUM, PICKING

(76) Inventor: Ebenezer Cook

Ebenezer Cook.

Letters Patent

The schedule referred to in these Letters Patent, and making part
of the same, containing a description in the words of the said Ebe-
nezer Cook himself of his Improvement in manufacturing
Oakum from Junk.

---

I construct a cistern of plank & timber about twenty feet
long & eleven feet wide & five feet deep holding about two
hundred Barrels of Water, with the corners rounded inside so
as to form an oval or eliptical figure inside for the purpose
of heating the water, I run a copper pipe commencing
at one end where its diameter is about fifteen inches
to receive the fire & elsewhere about 6 inches & near a corner
& thence close to the bottom the whole length of the cistern
forming a right angle at each corner of the back end & back
to the front end near the corner opposite to the one where
it commences.

I put in a false bottom of boards over but near the
pipe extending the whole length & width of the cistern for the
purpose of keeping the Oakum or Junk from coming in con-
tact with the pipe with small holes thro' it for the free pas-
sage of the water & heat on both sides of it.

I then construct a centre or [illegible] in the middle of the cis-
tern about three feet wide, & twelve feet long of an oval or elipti-
cal form, having its exterior surface equally distant from the
inside of the main Cistern, thereby forming a trough or channel
for the rapid & easy circulation of the water & Oakum there
In this channel on one side of said centre, I place a
paddle wheel about five feet in diameter, with four
paddles as long as the channel is wide & extending[illegible]

to its bottom, which being connected with water wheel is turned, so as to give to the whole body of water & junk in the channel a rapid motion by which the strands or threads of the junk become softened or separated more perfectly & in less time than by the process of boiling simply as heretofore used, after which it is carefully dried & pickled by machinery & becomes an article in texture & quality far superior to any that has been made in any other mode.

The Cistern & paddle Wheel are covered tight to prevent the heat from escaping by evaporation The Drawing or Plan hereto annexed marked A represents the front end of the Machine or Cistern & the drawing or plan hereto annexed marked B represents the surface of the Machine including the centre & Channel & Wheel when the Top or covering is removed.

The subscriber alleges that he is the sole Inventor of the principle & process aforesaid as well as of the mode of applying the same herein before described. What he claims as his Invention & Improvement and on which he founds his right to a Patent, is the method or principle of making Oakum & preparing the junk for that purpose by keeping it in motion or circulation in hot water, whether the same be effected by the Machinery & in the manner herein before described or by different Machinery or in any other manner.

In testimony that the above is a true specification of my said Improvement as above described I have hereto set my hand at Haddam this 2nd day of May A.D. 1832.

Witnesses
Jonathan Usher }
Caroline M Reed }

Ebenezer Cook

[illegible]) ([illegible] and Recorded anew March 4th 1843) [illegible]

[illegible]